Aug. 11, 1936. A. UHREN ET AL 2,050,548
LOG SKIDDING PAN
Filed Oct. 8, 1935 2 Sheets-Sheet 2
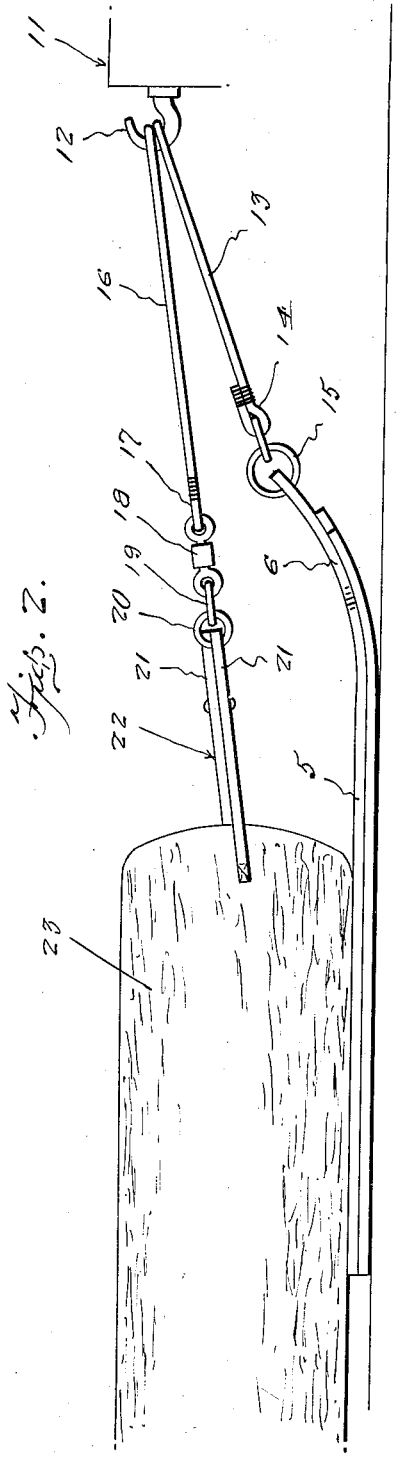
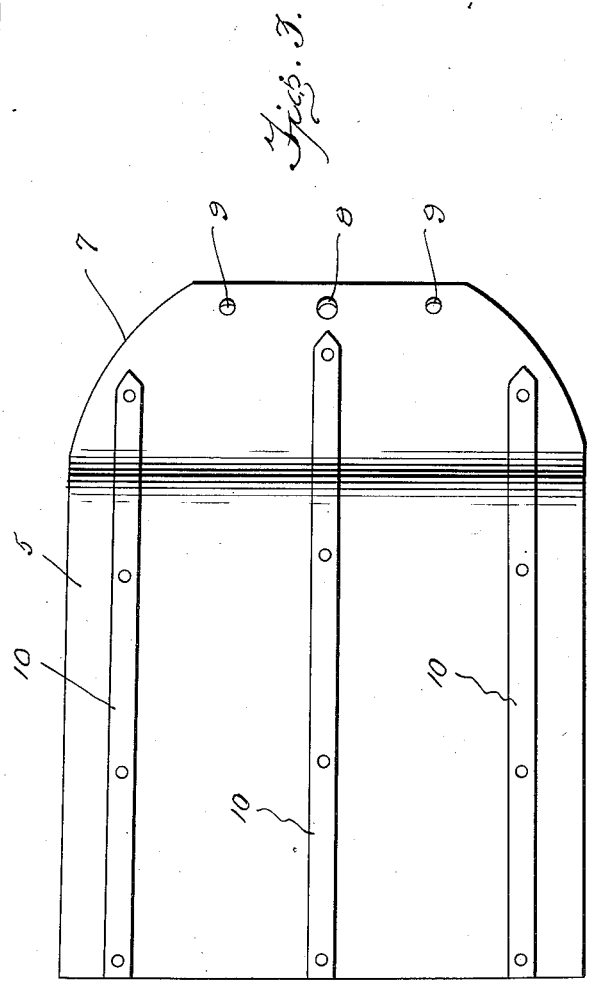
Inventors
A. Uhren
G. Springer
By Clarence A. O'Brien
Attorney Patented Aug. 11, 1936

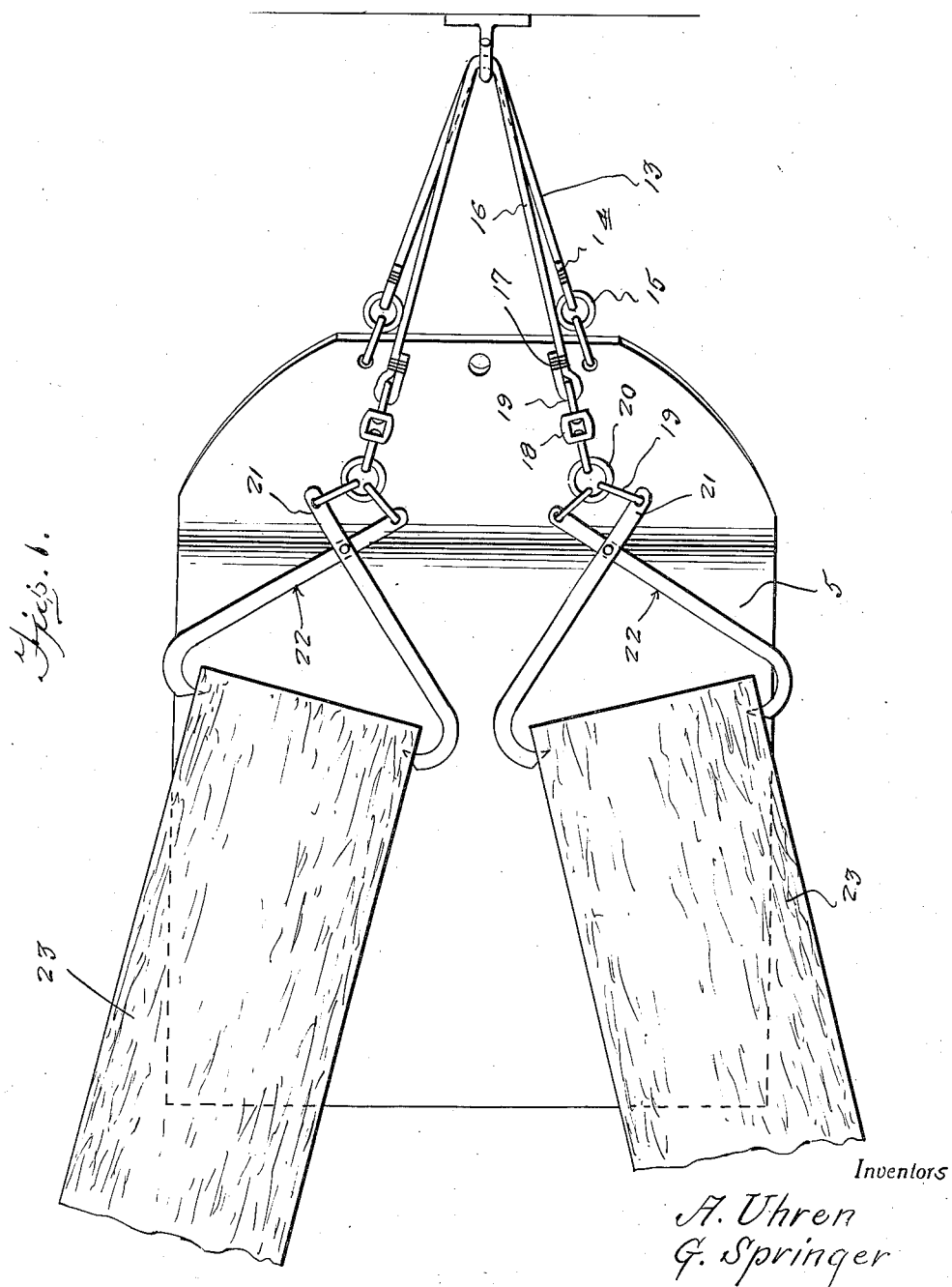

2,050,548

UNITED STATES PATENT OFFICE 2,050,548

LOG SKIDDING PAN

Andrew Uhren and George Springer,
Winter, Wis.

Application October 8, 1935, Serial No. 44,098

1 Claim. (Cl. 280—19)

This invention appertains to new and useful improvements in means for dragging logs through woods and over various kinds of ground without the use of trucks, wagons or sleds.

The principal object of the present invention is to provide a skid whereby logs can be easily brought along the ground when other forms of conveyance are not feasible.

During the course of the following specification other important objects and advantages of the invention will become apparent to the reader.

In the drawings:

Figure 1 represents a top plan view of the pan and showing the tongs associated therewith engaged with logs.

Figure 2 represents a side elevational view of the pan with logs engaged thereon.

Figure 3 represents a bottom plan view of the pan.

Referring to the drawings wherein like numerals designate like parts, it can be seen that the pan consists of a substantially square-shaped plate 5 curved upwardly at its forward end as at 6 and rounded off at its forward corner portions as at 7. The forward edge of the plate 5 is provided with a central opening 8 and side openings 9—9. The bottom of the plate 5 is provided with runner strips 10 suitably secured to the plate.

Referring to Figure 2, it can be seen that the tractor or other dragging vehicle is denoted generally by numeral 11 and has the hook 12 or some other connecting means located thereon.

A cable 13 is trained around this hook 12 and has its ends secured as at 14 to rings 15 passing through the openings 9 in the plate 5. A second cable 16 is trained over the hook 12 and has its end 17 connected to turnbuckles 18 which in turn are connected to rings 19 engaged with links 20 disposed through openings in the handle ends 21—21 of the tongs 22 which tongs are engaged with logs 23 as in the manner substantially shown in Figures 2 and 1.

While the foregoing specification sets forth the invention in specific terms, it is to be understood that numerous changes in the shape, size and materials may be resorted to without departing from the spirit or scope of the invention as claimed hereinafter.

Having thus described our invention, what we claim as new is:

A log skid comprising a ground engaging pan, a pair of tong structures, each of said tong structures including a control end and a log engaging end, links on one end of the pan, a flexible line having one end thereof connected to one of the links and the other end thereof to the other links, a second line substantially longer than the first mentioned line and having its ends connected to the control ends of the tong structures.

ANDREW UHREN.
GEORGE SPRINGER.